(12) United States Patent
Dorr et al.

(10) Patent No.: US 7,589,148 B2
(45) Date of Patent: Sep. 15, 2009

(54) PREPARATION OF A POLYURETHANE DISPERSION WITH BLOCKED ISOCYANATE GROUPS

(75) Inventors: Sebastian Dorr, Dusseldorf (DE); Heino Muller, Leverkusen (DE); Harald Blum, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/604,954

(22) Filed: Nov. 28, 2006

(65) Prior Publication Data

US 2007/0129488 A1    Jun. 7, 2007

(30) Foreign Application Priority Data

Dec. 1, 2005    (DE) ................. 10 2005 057 336

(51) Int. Cl.
*C08G 18/08* (2006.01)
(52) U.S. Cl. .................................... 524/589
(58) Field of Classification Search ................. 524/589
See application file for complete search history.

(56) References Cited

U.S. PATENT DOCUMENTS

| | | | | |
|---|---|---|---|---|
| 5,126,393 A | 6/1992 | Blum et al. | ................. | 524/538 |
| 5,455,297 A | 10/1995 | Pedian et al. | ................. | 524/591 |
| 6,187,860 B1 | 2/2001 | König et al. | ................. | 524/591 |
| 6,716,901 B2 | 4/2004 | Landeweer et al. | ......... | 524/591 |
| 2003/0045631 A1 | 3/2003 | Konig et al. | ................. | 524/589 |
| 2003/0109627 A1 | 6/2003 | Baumbach et al. | .......... | 524/507 |
| 2003/0114578 A1 | 6/2003 | Wamprecht et al. | ......... | 524/507 |
| 2003/0119977 A1 | 6/2003 | Wamprecht et al. | ......... | 524/589 |
| 2004/0266970 A1* | 12/2004 | Mazanek et al. | ............... | 528/45 |

FOREIGN PATENT DOCUMENTS

EP    157 291    7/1989

OTHER PUBLICATIONS

Ullmanns Encyclopädie der technischen Chemie, 4$^{th}$ edition, vol. 19, (date unavailable), pp. 31-38, Dr. Dieter Maassen et al, "Polyalkylenglykole".

* cited by examiner

*Primary Examiner*—Mark Eashoo
*Assistant Examiner*—Noah Frank
(74) *Attorney, Agent, or Firm*—Connolly Bove Lodge & Hutz LLP

(57) ABSTRACT

The present invention relates to the preparation of aqueous, cosolvent-free polyurethane dispersions with blocked isocyanate groups, to baking varnishes prepared from them, and to their use in coatings.

10 Claims, No Drawings

PREPARATION OF A POLYURETHANE DISPERSION WITH BLOCKED ISOCYANATE GROUPS

BACKGROUND OF THE INVENTION

The present invention relates to the preparation of aqueous, cosolvent-free polyurethane ("PU") dispersions with blocked isocyanate groups, to baking varnishes prepared from them, and to their use in coatings.

Recent years have seen a sharp rise in the profile of aqueous paints and coating materials in the wake of increasingly stringent emissions directives governing the solvents released during paint application. Although for many fields of application there are now aqueous coating systems available, these systems are often unable to attain the high quality level of conventional, solventborne coating materials with respect to solvent and chemical resistance, elasticity and mechanical durability.

Even waterborne paint systems, based for example on aqueous dispersions, frequently still contain cosolvents. For PU dispersions it is generally not possible to avoid these solvents, since the preparation of corresponding dispersions via prepolymers often necessitates cosolvents. In addition, in the absence of cosolvents, the PU dispersions and the paint formulations frequently lack storage stability. The solvent N-methylpyrrolidone ("NMP") in particular is in widespread use in the field of aqueous dispersions and paints. Examples are the polyisocyanate crosslinker dispersions with blocked isocyanate groups that are described in EP-A 0566953 or in EP-A 0942023. The crosslinker dispersions and the paints described in both references contain NMP as cosolvent.

The solvent NMP is suitable for preparing a large number of PU dispersions, but is classified as teratogenic by the European Union. As a consequence of this, this solvent ought to be avoided as much as possible.

The object of the invention is to provide cosolvent-free, storage-stable polyisocyanate dispersions with blocked isocyanate groups.

SUMMARY OF THE INVENTION

It has now been found that this object has been achieved by means of a specific preparation process. The invention provides a method of preparing polyurethane dispersions, comprising:

i) reacting:
  a) a polyisocyanate component,
  b) 50 to 90 equivalent %, based on the NCO groups of component a), of a thermally eliminable blocking agent,
  c) 10 to 50 equivalent %, based on the NCO groups of component a), of a hydroxy carboxylic acid as hydrophilicizing agent, and
  d) 0 to 15 equivalent %, based on the NCO groups of component a), of a chain extender which is at least difunctional relative to isocyanate-reactive groups;

ii) neutralizing the carboxylic acid groups with a neutralizing agent; and iii) dispersing the resulting polyurethane polymer in water;

wherein step i) is carried out by first dissolving components c) and optionally d) in component b) to form a solution, then mixing the solution with component a) to form a mixture; and wherein step ii) is performed before, during or after step iii).

DETAILED DESCRIPTION OF THE PREFERRED EMBODIMENTS

The proportions of the reaction partners are preferably selected such that the equivalent ratio of the NCO groups of isocyanate component a) to isocyanate-reactive groups of components b), c) and d) is 1:0.6 to 1:1.5 and with particular preference is 1:0.7 to 1:1.3.

The solution of b), c) and d) may optionally be heated; a preferred temperature range is 10° C. to 90° C. Step i) may optionally include adding additional component c) in undissolved form to the mixture. It is also possible to add a (partly) water-miscible solvent such as acetone or methyl ethyl ketone to the mixture. After the end of the reaction, and after dispersing has taken place, the solvent can be removed by distillation.

Polyisocyanates used as component a) are the NCO-functional compounds with a functionality of preferably two or more that are known per se to one of ordinary skill in the art. These are, typically, aliphatic, cycloaliphatic, araliphatic and/or aromatic diisocyanates or triisocyanates and also their higher molecular mass derivatives with urethane, allophanate, biuret, uretdione and/or isocyanurate groups, the derivatives also containing two or more free NCO groups.

Preferred diisocyanates or polyisocyanates are tetramethylene diisocyanate, cyclohexane 1,3- and 1,4-diisocyanate, hexamethylene diisocyanate (HDI), 1-isocyanato-3,3,5-trimethyl-5-isocyanatomethylcyclohexane (isophorone diisocyanate, IPDI), methylenebis(4-isocyanatocyclohexane), tetramethylxylylene diisocyanate (TMXDI), triisocyanatononane, tolylene diisocyanate (TDI), diphenylmethane-2,4'- and/or 4,4'-diisocyanate (MDI), triphenylmethane 4,4'-diisocyanate, naphthylene 1,5-diisocyanate, 4-isocyanatomethyloctane 1,8-diisocyanate (nonane triisocyanate, triisocyanatononane, TIN) and/or undecane 1,6,11-triisocyanate, and also any desired mixtures thereof.

Such polyisocyanates typically have isocyanate contents of 0.5% to 55% by weight, preferably 3% to 30% by weight, with particular preference 5% to 25% by weight.

Particularly preferred polyisocyanates a) for preparing the hydrophilicized polyisocyanates or polyurethanes of the invention conform to the aforementioned type and contain biuret, isocyanurate and/or uretdione groups, and are based preferably on hexamethylene diisocyanate, isophorone diisocyanate and/or 4,4'-diisocyanatodicyclohexylmethane.

Suitable thermally eliminable blocking agents b) are, for example, ε-caprolactam, diethyl malonate, ethyl acetoacetate, oximes such as butanone oxime, diisopropylamine, ester amines such as alkylalanine esters, dimethylpyrazole, triazole and/or mixtures thereof and optionally also further blocking agents. Preference is given to benzyl-tert-butylamine, butanone oxime, diisopropylamine, 3,5-dimethylpyrazole, triazole and/or mixtures thereof.

Examples of hydroxy carboxylic acids c) are monohydroxy and dihydroxy carboxylic acids, such as 2-hydroxyacetic acid, 3-hydroxypropanoic acid, 12-hydroxy-9-octadecanoic acid (ricinoleic acid), hydroxypivalic acid, lactic acid and/or dimethylolpropionic acid. Preference is given to hydroxypivalic acid, lactic acid and/or dimethylolpropionic acid, particular preference to hydroxypivalic acid.

In addition to the hydrophilicization by means of at least one hydroxy carboxylic acid, it is additionally possible to use suitable compounds having a nonionically hydrophilicizing action. These are, for example, polyoxyalkylene ethers which contain at least one hydroxyl or amino group. These polyethers include a fraction of 30% by weight to 100% by weight of building blocks containing ethylene oxide. Suitability is possessed by polyethers of linear construction with a functionality of between 1 and 3, but also by branched polyethers.

Nonionically hydrophilicizing compounds also include, for example, monohydric polyalkylene oxide polyether alcohols which contain on average 5 to 70, preferably 7 to 55, ethylene oxide units per molecule, these alcohols being of the kind obtainable in conventional manner by alkoxylating suitable starter molecules (e.g. in Ullmanns Encyclopädie der technischen Chemie, 4th edition, volume 19, Verlag Chemie, Weinheim pp. 31-38).

The polyalkylene oxide polyether alcohols are either straight polyethylene oxide polyethers or mixed polyalkylene oxide polyethers at least 30 mol %, preferably at least 40 mol %, of whose alkylene oxide units are composed of ethylene oxide units. Preferred nonionic compounds are monofunctional mixed polyalkylene oxide polyethers which contain at least 40 mol % of ethylene oxide units and not more than 60 mol % of propylene oxide units.

Suitable chain extenders d) include, for example, diols, triols and/or polyols. Examples are ethanediol, di-, tri- and tetraethylene glycol, 1,2-propanediol, di-, tri-, tetrapropylene glycol, 1,3-propanediol, butane-1,4-diol, butane-1,3-diol, butane-2,3-diol, pentane-1,5-diol, hexane-1,6-diol, 2,2-dimethyl-1,3-propanediol, 1,4-di-hydroxycyclohexane, 1,4-dimethylolcyclohexane, octane-1,8-diol, decane-1,10-diol, dodecane-1,12-diol, trimethylolpropane, castor oil, glycerol and/or mixtures of the aforementioned products, optionally with further diols, triols and/or polyols. Additionally, ethoxylated and/or propoxylated diols, triols and/or polyols, such as ethoxylated and/or propoxylated trimethylolpropane, glycerol and/or hexane-1,6-diol, can be used.

In addition, it is possible to employ diamines, triamines and/or polyamines containing primary and/or secondary amino groups. Examples are ethylenediamine, 1,3-propylenediamine, 1,6-hexamethylenediamine, isophoronediamine, 4,4'-diaminodicyclohexylmethane or hydrazine.

Mixtures of amines and alcohols are possible too, and compounds of mixed functionality—molecules with different isocyanate-reactive groups—can be used, such as N-methylethanolamine and N-methylisopropanolamine, 1-aminopropanol, diethanolamine, 1,2-hydroxyethanethiol or 1-aminopropanethiol, for example.

Examples of neutralizing agents used in step ii) are basic compounds such as sodium hydroxide, potassium hydroxide, triethylamine, N,N-dimethyl-aminoethanol, dimethylcyclohexylamine, triethanolamine, methyldiethanolamine, diisopropanolamine, ethyldiisopropylamine, diisopropylcyclohexylamine, N-methylmorpholine, 2-amino-2-methyl-1-propanol, ammonia or any desired mixtures thereof. Preferred neutralizing agents are tertiary amines such as triethylamine, diisopropylhexylamine and N,N-dimethylethanolamine, and N,N-dimethylethanolamine is particularly preferred.

The amount of neutralizing agent used is generally calculated such that the degree of neutralization of the carboxylic acid groups present in the polyurethanes of the invention (molar ratio of amine/hydroxide used to acid groups present) is at least 40%, preferably 70% to 130%, more preferably 90% to 110%. This neutralization may take place before, during or after the dispersing or dissolving step. Preference, however, is given to neutralization prior to the addition of water.

It is also possible to add a (partly) water-miscible solvent such as acetone or methyl ethyl ketone to the reaction mixture. After the end of the reaction, water is added to the reaction mixture and the solvent is distilled off. This is also referred to as the acetone or slurry process. The advantage of this procedure lies in a reduced viscosity for the preparation of the prepolymer, without the solvent still being present in the eventual dispersion.

The aqueous dispersions or solutions generally have a solids content of 15 to 65% by weight, preferably of 25% to 60% by weight, more preferably of 30% to 50% by weight.

The average particle diameters are in general in the range from 5 to 200 nm, preferably from 8 to 150 nm, more preferably from 10 to 100 nm.

It is likewise possible to add catalysts to the reaction mixture. Examples of suitable catalysts include tertiary amines, compounds of tin, of zinc or of bismuth, or basic salts. Preference is given to dibutyltin dilaurate and dibutyl octoate.

The blocked polyurethane dispersions of the invention are used for preparing baking varnishes, for coating substrates, preferably of metals, mineral substances, wood, plastics, for industrial coating, for example, in the coating of textiles, and in automotive OEM finishing. For this purpose the coating materials of the invention can be applied by knifecoating, dipping, spray application such as compressed-air spraying or airless spraying, and also by electrostatic application, an example being high-speed rotating bell application. The dry film thickness can be for example from 10 to 120 µm. The dried films are cured by baking in the temperature range from 90 to 190° C., preferably 120 to 180° C., more preferably 130 to 170° C.

In order to produce coating materials, adhesives and elastomers it is possible to mix the polyurethane dispersions of the invention, containing blocked isocyanate groups, with at least difunctional, isocyante-reactive compounds, such as any desired polyol components, preferably in the form of aqueous dispersions.

Polyol components of this kind may be polyhydroxy polyesters, polyhydroxy polyurethanes, polyhydroxy polyethers, polycarbonate diols or hydroxyl-containing polymers, examples being the conventional polyhydroxy polyacrylates, polyacrylate-polyurethanes and/or polyurethane-polyacrylates. These components generally have a hydroxyl number of 20 to 200, preferably of 50 to 130 mg KOH/g. The hydrophilic modification these polyhydroxyl compounds may require takes place in accordance with conventional methods, as disclosed for example in EP-A-0 157 291 or EP-A-0 427 028. Also possible is a mixture with other alcohol-reactive compounds, such as amino-crosslinker resins, for example melamine resins, and/or urea resins, for the purpose of additional crosslinking in the course of baking.

The paints, inks, adhesives and other formulations are prepared from the dispersions of the invention by methods that are known per se. Besides the blocked polyisocyanates and polyols, it is possible for typical additives and other auxiliaries (e.g. pigments, fillers, flow control agents, defoamers, catalysts) to be added to the formulations.

EXAMPLES

Chemicals

Desmodur® N 3300:
Isocyanurate based on hexamethylene diisocyanate, Bayer MaterialScience AG, Leverkusen, DE Bayhydrol® D 270
Hydroxyl-containing aqueous polyester dispersion, Bayer MaterialScience AG, Leverkusen, DE Additol XW 395
Flow control assistant/defoamer, UCB Chemicals, St. Louis, USA Surfynol 104
Flow control assistant/defoamer, Air Products, Hattingen, DE Hydroxypivalic Acid Perstorp Specialty Chemicals AB, Perstorp, Sweden Unless noted otherwise, all percentages are by weight.

Unless noted otherwise, all analytical measurements are based on temperatures of 23° C.

The reported viscosities were determined by means of rotational viscometry in accordance with DIN 53019 at 23° C. using a rotational viscometer from Anton Paar Germany GmbH, Ostfildern, DE NCO contents, unless expressly mentioned otherwise, were determined volumetrically in accordance with DIN-EN ISO 11909.

The particle sizes reported were determined by means of laser correlation spectroscopy (instrument: Malvern Zetasizer 1000, Malvern Instr. Limited).

The solids contents were determined by heating a weighed sample at 120° C. When constant weight was reached, the samples were weighed again to allow calculation of the solids content.

Monitoring for free NCO groups was carried out by means of IR spectroscopy (band at 2260 cm$^{-1}$).

1) Comparative Example 1

Polyurethane Dispersion, Not in Accordance with the Invention, Preparation in NMP as Solvent A stirred apparatus was charged with 214.50 g (1.1 eq) of Desmodur N 3300 in 81 g of NMP and this initial charge was heated to 50° C. under nitrogen. 60.98 g (0.7 eq) of butanone oxime were added dropwise over the course of about an hour, and the mixture was left with stirring at 80-90° C. for about 2 hours until a constant isocyanate value was reached (theoretical: 6.09%, obtained: 6.04%).

Subsequently 5.91 g (0.1 eq) of 1,6-hexanediol and 23.60 g (0.2 eq) of hydroxypivalic acid were added and stirring was continued at a temperature of around 90° C. until isocyanate groups were no longer detectable by IR spectroscopy (about 15 hours).

Thereafter the reaction mixture was cooled to 85° C., admixed with 19.81 g (0.220 eq) of N,N-dimethylethanolamine, stirred again for 10 minutes, and admixed with 478.00 g of deionized water at 50° C., with vigorous stirring. It was then stirred at 50° C. for 2 hours and subsequently cooled to room temperature with stirring (in about 3 hours).

The dispersion obtained had the following properties:

| | |
|---|---|
| Solids content: | about 38% |
| pH: | about 8.66 |
| Viscosity: | about 6400 mPas (23° C., rotational viscometer) |
| Particle size (LCS): | 14 nm |
| Cosolvent: | 5% NMP |

2) Comparative Example 2

Polyurethane Dispersion, Not in Accordance with the Invention, Addition of Chain Extender and Hydrophilicizing Agent after the Addition of the Blocking Agent A stirred apparatus was charged with 214.50 g (1.1 eq) of Desmodur N 3300 and this initial charge was heated to 50° C. under nitrogen. 60.98 g (0.7 eq) of butanone oxime were added dropwise over the course of about an hour, and the mixture was left with stirring at 80-90° C. for about 2 hours until a constant isocyanate value was reached (theoretical: 6.09%, obtained: 6.04%).

Subsequently 5.91 g (0.1 eq) of 1,6-hexanediol and 23.60 g (0.2 eq) of hydroxypivalic acid were added and stirring was continued at a temperature of around 90° C. until isocyanate groups were no longer detectable by IR spectroscopy (about 15 hours).

Thereafter the reaction mixture was cooled to 85° C., admixed with 19.81 g (0.220 eq) of N,N-dimethylethanolamine, stirred again for 10 minutes, and admixed with 478.00 g of deionized water at 50° C., with vigorous stirring. It was then stirred at 50° C. for 2 hours and subsequently cooled to room temperature with stirring (in about 3 hours).

The dispersion obtained had the following properties:

| | |
|---|---|
| Solids content | about 38% |
| pH: | about 9.1 |
| Viscosity: | about 1500 mPas (23° C., rotational viscometer) |
| Particle size (LCS): | 68 nm |

The dispersion obtained was not stable on storage; within a few days, both when stored at room temperature and when stored in a controlled-climate cabinet at 40° C., a sediment formed by precipitation. The product could therefore not be used for coatings.

3) Comparative Example 3

Polyurethane Dispersion, Not in Accordance with the Invention, Addition of Chain Extender and Hydrophilicizing Agent before the Addition of the Blocking Agent A stirred apparatus was charged with 214.50 g (1.1 eq) of Desmodur N 3300 and this initial charge was heated to 50° C. under nitrogen. 5.91 g (0.1 eq) of 1,6-hexanediol and 23.60 g (0.2 eq) of hydroxypivalic acid were added, and the mixture was left with stirring at 80-90° C. for about 2 hours until a constant isocyanate value was reached (theoretical: 6.09%). In the course of this addition the reaction mixture became highly viscous and wound around the stirrer; a complete mixture was no longer present.

As a result of the high viscosity it was impossible to continue the experiment, and it was therefore discontinued.

4) Comparative Example 4

Polyurethane Dispersion, Not in Accordance with the Invention, Addition of Chain Extender and Hydrophilicizing Agent before the Addition of the Blocking Agent, Preparation by the Acetone Process The procedure described in Comparative Example 2 was repeated, but the Desmodur N 3300 was dissolved in 100 g of acetone. Temperature monitoring took place by the reflux of the acetone at atmospheric pressure, establishing a temperature of just about 70° C. Following addition of 1,6-hexanediol and 23.60 g (0.2 eq) of hydroxypivalic acid, the prepolymer, after about 2 hours, wound around the stirrer. Further addition of 100 g of acetone was unable to dissolve the prepolymer, and so the experiment was discontinued.

It was found that a version with acetone as cosolvent did not lead to the desired crosslinker dispersion either.

5) Polyurethane Dispersion, in Accordance with the Invention, Addition of a Solution of the Chain Extender and of the Hydrophilicizing Agent in the Blocking Agent A stirred apparatus was charged with 214.50 g (1.1 eq) of Desmodur N 3300 and this initial charge was heated to 50° C. under nitrogen. Added thereto over the course of about an hour, dropwise, was a solution of 5.91 g (0.1 eq) of 1,6-hexanediol and 23.60 g (0.2 eq) of hydroxypivalic acid in 60.98 g (0.7 eq) of butanone oxime, the dropwise addition taking place at a rate such as not to exceed a temperature of 90° C. Thereafter the mixture was stirred further at 90° C. until isocyanate groups were no longer detectable by IR spectroscopy (about 12 hours).

Thereafter the reaction mixture was cooled to 85° C., admixed with 19.81 g (0.220 eq) of N,N-dimethylethanolamine, stirred again for 10 minutes, and admixed with 478.00 g of deionized water at 50° C., with vigorous stirring. It was then stirred at 50° C. for 2 hours and subsequently cooled to room temperature with stirring (in about 3 hours).

The very fine-particled, yellow dispersion obtained had the following properties:

| | |
|---|---|
| Solids content: | about 38% |
| pH: | about 9.1 |
| Viscosity: | about 1600 mPas (23° C., rotational viscometer) |
| Particle size (LCS): | 17 nm |

The dispersion obtained was stable on storage; both when stored at room temperature and when stored in a controlled-climate cabinet at 40° C., no settlement was perceivable within 3 months.

Performance Section

Clearcoat materials of the compositions below were prepared. The clearcoat materials were used to produce films, which were dried at room temperature for 10 minutes and then baked at 165° C. for 30 minutes. The resultant films were assessed from a performance standpoint. The results are compiled in the table below.

TABLE 1

Performance test (Amounts in grams)

| | Example No. | | |
|---|---|---|---|
| | 6 | 7 (comparative) | 8 (comparative, NMP-containing) |
| Dispersion from example | 5 | 2 | 1 |
| Amount of dispersion | 91.1 | 91.1 | 91.1 |
| Desmophen ® D 270 | 50.0 | 50.0 | 50.0 |
| Additol XW 395 | 1.1 | 1.1 | 1.1 |
| Surfynol 104 | 1.1 | 1.1 | 1.1 |
| Distilled water | 66.3 | 66.3 | 66.3 |
| Solids in paint, theoretical | 31.9 | 31.9 | 31.9 |
| Flow time of paint formulation [s][3] | 38 | [5] | 39 |
| Baking conditions | 10'RT + 20'165° C. | 10'RT + 20'165° C. | 10'RT + 20'165° C. |
| Film optical properties (visual test) | o.k. | caking, disrupted flow | o.k. |
| Pendulum hardness [s][2] | 103 | [5] | 101 |
| Salt spray test 144 h; Scribe creep in mm[4] | 20 | [5] | 28 |

TABLE 1-continued

Performance test (Amounts in grams)

| | Example No. | | |
|---|---|---|---|
| | 6 | 7 (comparative) | 8 (comparative, NMP-containing) |
| Initial dissolubility[1] | 2/2/4/4 | [5] | 2/3/4/4 |

[1]1 minute, sequence of solvents as follows: xylene/methoxypropyl acetate/ethyl acetate/acetone: assessment: 0 very good to 5 poor
[2]The pendulum hardness was measured by the method of Konig in accordance with DIN 53157.
[3]The flow time was determined in a cup in accordance with DIN 53 211.
[4]For the salt spray test the paints are spray-applied by means of gravity-fed cup-type guns to steel panels and baked. The salt spray test was carried out in accordance with DIN 53 167.
[5] Implementation not possible, because the dispersion already contained a considerable sediment. The sediment prevented reliable paint testing through performance tests.

In the course of performance testing it was found that the prepared paint of Example 6) from inventive dispersion 5) met the requirements in terms of flow, hardness, solvent resistance and salt spray test. For that paint formulation no solvent was added.

Example 7) reveals that with a system of comparable composition but without cosolvent it was not possible to achieve an acceptable paint formulation unless the dispersion was prepared by the process of the invention.

Example 8) shows a comparable, NMP-containing dispersion. The technical paint properties are comparable with those of inventive Example 5, but the scribe creep in the salt spray test is poorer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of preparing a polyurethane dispersion, comprising:
   i) reacting:
      a) a polyisocyanate component,
      b) 50 to 90 equivalent %, based on the NCO groups of component a), of a thermally eliminable blocking agent,
      c) 10 to 50 equivalent %, based on the NCO groups of component a), of a hydroxyl carboxylic acid as hydrophilicizing agent, and
      d) 0 to 15 equivalent %, based on the NCO groups of component a), of a chain extender component which is at least difunctional relative to isocyanate-reactive groups;
   ii) neutralizing the carboxylic acid groups with a neutralizing agent; and
   iii) dispersing the resulting polyurethane polymer in water; wherein step i) is carried out by first dissolving components c) and optionally d) in component b) to form a solution, then mixing the solution with component a) to form a mixture; wherein step ii) is performed before, during or after step iii); and wherein the resulting polyurethane dispersion is co-solvent free.

2. A method according to claim 1, wherein the equivalent ratio of the NCO groups of the isocyanate component to the isocyanate-reactive groups of the other components is 1:0.6 to 1:1.5.

3. A method according to claim 1, wherein the equivalent ratio of the NCO groups of the isocyanate component to the isocyanate-reactive groups of the other components is 1:0.6 to 1:1.5.

4. A method according to claim 1, wherein the polyisocyanate component a) comprises polyisocyanates containing biuret, isocyanurate and/or uretdione groups based on hexamethylene diisocyanate, isophorone diisocyanate and/or 4,4'-diisocyanatodicyclohexylmethane.

5. A method according to claim 1, wherein the blocking agent is selected from the group consisting of benzyl-tert-butylamine, butanone oxime, diisopropylamine, 3,5-dimethylpyrazole, triazole and mixtures of these compounds.

6. A method according to claim 1, wherein the hydrophilicizing agent is selected from the group consisting of hydroxypivalic acid, lactic acid and dimethylolpropionic acid.

7. Dispersions obtained by the method of claim 1.

8. Coatings obtained with dispersions according to claim 7.

9. Substrates coated with coatings according to claim 8.

10. Binder combinations comprising polyurethane dispersions according to claim 7.

* * * * *